United States Patent [19]
Tate et al.

[11] Patent Number: 4,613,664
[45] Date of Patent: Sep. 23, 1986

[54] PROCESS FOR PRODUCTION OF POLYESTER

[75] Inventors: Susumu Tate, Shiga; Hiroshi Hashimoto, Otsu; Akira Chiba, Kobe, all of Japan

[73] Assignee: Toyo Boseki Kabushiki Kaisha, Osaka, Japan

[21] Appl. No.: 813,460

[22] Filed: Dec. 26, 1985

[30] Foreign Application Priority Data

Dec. 28, 1984 [JP] Japan .................................. 59-279547
Jun. 20, 1985 [JP] Japan .................................. 60-135349
Jun. 27, 1985 [JP] Japan .................................. 60-141247

[51] Int. Cl.$^4$ ....................... C08G 63/04; C08G 63/22
[52] U.S. Cl. .................................... 528/274; 528/277; 528/497
[58] Field of Search ..................... 528/274, 277, 497

[56] References Cited

U.S. PATENT DOCUMENTS

| 4,003,880 | 1/1977 | Sidebotham et al. | 528/497 |
| 4,118,187 | 10/1978 | Sidebotham et al. | 528/497 |
| 4,223,124 | 9/1980 | Broughton et al. | 528/274 |
| 4,346,209 | 8/1982 | Forschirm et al. | 528/497 |
| 4,543,364 | 9/1985 | Nankee et al. | 528/497 |

Primary Examiner—Lucille M. Phynes

[57] ABSTRACT

A process for production of polyester which comprises steps of:
subjecting aromatic dicarboxylic acid or alkyl ester thereof, and glycol to ester exchange reaction or esterification, and
subjecting the resulting mixture to polycondensation in a specific heating medium.

The process can be carried out by using of small energy and a simple apparatus, and provides polyester having high quality.

5 Claims, 2 Drawing Figures

PROCESS FOR PRODUCTION OF POLYESTER

FIELD OF THE INVENTION

The present invention relates to a process for production of polyester. More particularly, the present invention relates to a process for production of polyester from an aromatic dicarboxylic acid or an alkyl ester thereof and glycols wherein polycondensation reaction is conducted in a specific heating medium.

BACKGROUND OF THE INVENTION

A polyester is generally produced by direct esterification of an aromatic dicarboxylic acid and glycol, or by ester exchange reaction of an alkyl ester of aromatic dicarboxylic acid and glycol to give a glycol ester and/or an oligomer followed by heating them with stirring under high vacuum to effect polycondensation.

While, U.S. Pat. No. 2,597,643 discloses that polymerization of polyester can be carried out in a solvent. In such reaction, the polymerization is, however, carried out in a solution which can completely dissolve a resulting polyester, and hence, the resulting polyester has a very low intrinsic viscosity of 0.4–0.7.

There has been widely and industrially used a process wherein polycondensation is carried out by heating and stirring under a high vacuum. This process, however, requires certain vacuum apparatus to keep high vacuum and high power for stirring of material having high viscosity.

Further, since materials for industry use, such as a tire cord and the like, require higher physical properties, there is used polyester having a high molecular weight. However, it is difficult to stir such polyester having higher molecular weight, and hence, a polymer obtained by melt polycondensation is generally subjected to further polymerization in a solid phase under an inert gas flow for a long term of time.

OBJECTS AND SUMMARY OF THE INVENTION

In order to solve the above defects, the present inventors have intensively studied. As the result, it has been found that polycondensation in a specific heating medium is effective and the present invention has been perfected.

It is an object of the present invention to provide a process for production of polyester which does not require vacuum apparatus and high power for stirring a polymer.

It is another object of the present invention to provide a simple process for production of polyester having a high molecular weight.

These and other objects and advantages of the present invention will be apparent to skilled persons in the art from the following description.

The process for production of polyester of the present invention comprises steps of:

subjecting aromatic dicarboxylic acid or alkyl ester thereof, and glycol to ester exchange reaction or esterification, and subjecting the resulting mixture to polycondensation in one or more of heating mediums selected from the group consisting of compounds having the following general formula (I) or (II) to give a polyester having an intrinsic viscosity of not less than 0.9:

$$A^1-A^2 \cdots A^k \quad (I)$$

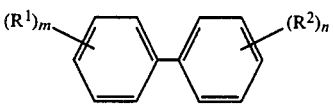

(II)

(wherein $A^1$ and $A^k$ are phenyl or $C_{5-20}$ cycloalkyl; $A^2$ to $A^{k-1}$ are, respectively, phenylene or $C_{5-20}$ cycloalkylene; $R^1$ and $R^2$ are $C_{1-20}$ alkyl; k is integer of 2–5; and m and n are integer of 0–5, provided that $n+m \geq 1$).

DETAILED DESCRIPTION OF THE INVENTION

Figure 1:
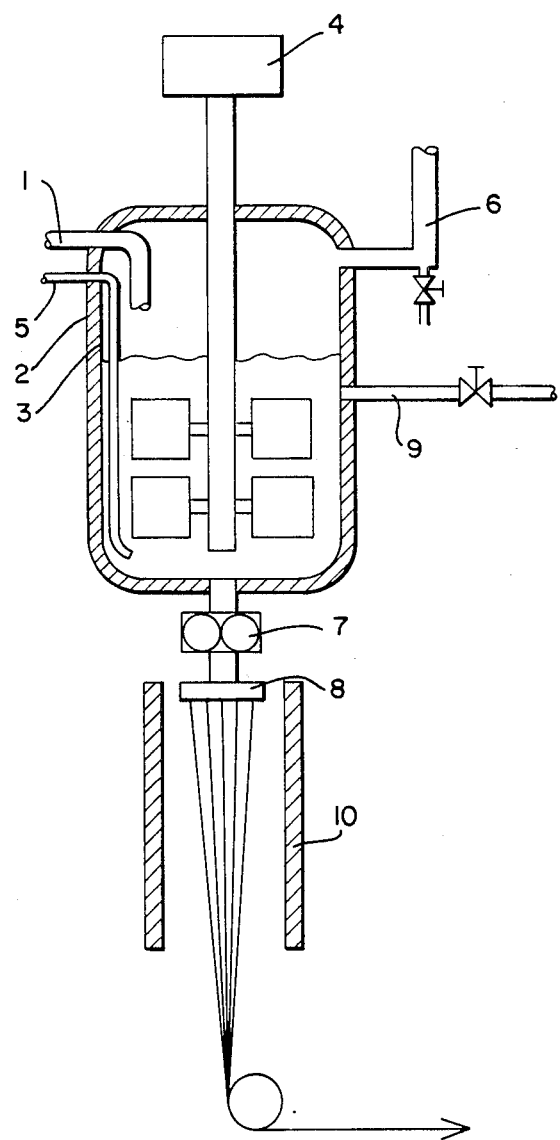
FIG. 1 is a schematic cross-sectional view of the apparatus used in the present invention.

The term "heating medium herein means a heat-stable organic compound which can be used as a liquid within a range of the reaction temperature, and there is exemplified aromatic hydrocarbon, aliphatic hydrocarbon, alicyclic hydrocarbon and aromatic ether. Suitable examples of such heating medium used in the present invention are heating mediums which can swell polyesters and can not solve polyesters, or one or more than two kinds of the compound of the above formulas (I) and (II), for example, triethyl biphenyl, tetraethyl bephenyl, tripropyl biphenyl, cyclohexyl benzene, hydrogenated triphenyl and the like. The heating medium can be purified prior to use by known method, such as distillation.

Aromatic dicarboxylic acid or alkyl ester thereof used in the present invention includes terephthalic acid, isophthalic acid, p-β-oxyethoxybenzoic acid, 2,6-naphthalenedicarboxylic acid, 4,4'-dicarboxyldiphenyl, 4,4'-dicarboxylbenzophenone, bis(4-carboxylphenyl)ethane, sodium 5-sulfoisophthalate, or alkyl esters thereof such as methyl, ethyl and propyl ester.

The glycol used in the present invention includes ethylene glycol, propylene glycol, butane diol, neopentyl glycol, diethylene glycol, cyclohexane dimethanol, ethylene oxide adduct of bisphenol A.

The process of the present invention can produce polyester having an intrinsic viscosity of not less than 0.9 or 1.0, and also can be produced polyester having an intrinsic viscosity not less than 2.0 in an appropriate condition. The intrinsic viscosity in the present invention is determined according to the following method.

The intrinsic viscosity was measured with a mixture of p-chlorophenol (PCP)/tetrachloroethane (TCE) (3/1) at 30° C., and the resulting value was converted to the viscosity in phenol/tetrachloroethane (6/4) using the following formula:

$$[\eta]\ 60/40\ \text{phenol/TCE} = 0.8352\ [\eta]\ 3/1\ \text{PCP/TCE} + 0.005$$

The detailed process for production of polyester of the present invention is illustrated as follows.

According to the present invention, polyester can be produced as follows:

Firstly, aromatic dicarboxylic acid or alkyl ester thereof and glycol are subjected to esterification or ester exchange reaction by a conventional method to give oligomer. That is, there is carried out the esterification of aromatic dicarboxylic acid with glycol, or ester exchange reaction of alkyl ester of aromatic dicarboxylic acid with glycol. Then the oligomer is heated and stirred with the heating medium in the presence of known polycondensation catalyst such as antimony, titanium, cobalt, manganese, germanium, tungsten compound under ambient, reduced or certain pressure, at about 200°–300° C., preferably at 220°–280° C. for about 1–20 hours to give polyester.

Particularly preferred catalyst used in the present invention includes tungsten compound such as tungstic acid or a salt thereof, which is compatible to polyester, however, other conventional catalyst such as antimony, titanium, germanium, cobalt, manganese compound may be used in combination with the above tungsten compound.

By-product glycol, which is transferred into the heating medium, can be removed with an inert gas by blowing the inert gas (e.g. nitrogen, carbon dioxide, helium, argon and the like) into the reaction system, or by replacing the said heating medium by a new one.

According to the present invention, polyester having further higher intrinsic viscosity can be produced as follows:

(i) By the conventional method, the esterification or ester exchange reaction of the said aromatic dicarboxylic acid or alkyl ester thereof and glycol is carried out to give oligomer;

(ii) The oligomer is subjected to melt polycondensation under a high vacuum to give polyester by the conventional method, or the oligomer is subjected to polycondensation in the said specific heating medium to give polyester by the present invention;

(iii) The resulting polyester is formed into a chip and charged into a solid polymerization tank; and (iv) In the polymerization tank, the resulting polyester chip and the heating medium are heated with stirring under ambient, reduced or certain pressure, at about 150°–240° C., preferably at 210°–230° C. for about 1–20 hours to give a ultra-high-molecular-weight polyester.

By-product glycol into the heating medium during the reaction can be removed with an inert gas, such as nitrogen, carbon dioxide, helium, argon gas, blown into the reaction system or removed by replacing the said heating medium by a new one.

Thus obtained polyester can be directly spun into fiber while swelled with the heating medium. For example, the apparatus shown in FIG. 1 can be used. The oligomer obtained by esterification or ester exchange reaction of the aromatic dicarboxylic acid or alkyl ester thereof with glycol as well as the heating medium are continuously supplied into a polycondensation vessel 3 via an inlet 1. The vessel 3 is provided with a heating jacket 2 and a stirrer 4. While, the inert gas is introduced into the reaction system via inlet 5 and the produced gas by the reaction is expelled through an outlet 6 for waste gas. Polyester is obtained by the polycondensation reaction as precipitates on the bottom of the reaction vessel 3. The resulting polyester is formed into a fiber via a constant delivery pump 7 and a spinning head 8 while swelled with the heating medium. Then the heating medium is removed by washing with an organic solvent such as acetone. During the reaction, the heating medium in the reaction vessel 3 is expelled through a heating medium outlet 9 and successively replaced by a new one.

The spinning condition is not restricted, but for example, the spinning may be carried out by extrusion of the product using an extruder or a gear pump via a nozzle having a diameter of about 0.1–1.0 mm, at the rate of 0.1–10 g/min per each nozzle at about 250°–300° C., with an inert gas at the discharge pressure of 1–5 kg/cm$^2$G, and by winding at take-up rate of 10–1,000 m/min at the ambient temperature of 30°–50° C. Then the product is stretched to 3–15 times at 100°–180° C. according to the conventional method to give a polyester fiber.

It is assumed that the heating medium of the present invention has the following properties. That is, the polycondensation reaction is equilibrated with a by-product glycol, and hence, a high-molecular-weight polymer can not be obtained unless the by-product glycol is expelled from the polymerization system. It is believed that the heating medium partly impregnates into the polymer and swells it to remove the by-product glycol from the polymer, resulting in facilitating polycondensation reaction.

EXAMPLE

The following examples are construed to illustrate the present invention in detail but not to be limited thereto.

EXAMPLE 1

Into a 500 ml reactor, equipped with a stirrer, an inert gas inlet, a waste gas outlet, and a bottom discharge opening, were charged an oligomer directly obtained from esterification of terephthalic acid and ethylene glycol (containing 0.10 mol % of antimony as a polymerization catalyst based on an acid component and having an intrinsic viscosity of 0.21) (50 g), and hydrogenated triphenyl (produced by Shin-Nihon Seitetsu Kagaku Kogyo KK, sold under the trade name of Therm S-900) (250 ml). Then the mixture was heated with stirring at 260° C. under 3.0 L/min of nitrogen flow. A waste gas, a part of the heating medium and a by-product ethylene glycol were discharged via discharge opening while a fresh heating medium was added to keep the constant liquid level. At predetermined intervals, obtained polyethylene terephthalate was removed, washed thoroughly with acetone and dried. The intrinsic viscosity of the resulting white polyester was measured. The results are shown in FIG. 2 (curve A).

EXAMPLES 2 and 3

The procedure of Example 1 was repeated, except that polycondensation temperature was 280° C. and 240° C., respectively. The relationships between intrinsic viscosity of each resulting polyester and polycondensation time are shown in FIG. 2 (curve B: Example 2, curve C: Example 3).

Figure 2:
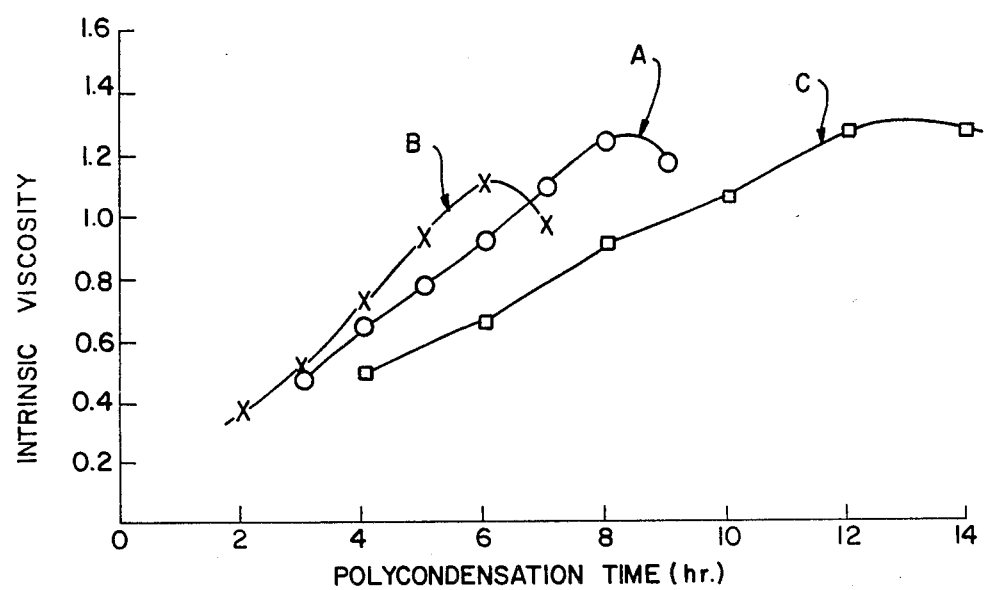
FIG. 2 shows a relationship between polycondensation time and intrinsic viscosity of the polyester obtained in Examples 1–3, wherein A, B and C are respectively corresponding to Example 1 (Polymerization temperature: 260° C.), Example 2 (Polymerization temperature: 280° C.), and Example 3 (Polymerization temperature: 240° C.).

As is obvious from FIG. 2, at a high reaction temperature the polycondensation rate is high, however those of thermal decomposition and side reaction are also high, so that the maximum ultimate molecular weight becames low. On the other hand, it is understandable that the reaction at a low temperature makes the maximum ultimate molecular weight of the product high but requires a long term of reaction time.

EXAMPLE 4

The procedure of Example 1 was repeated except that hydrogenated triphenyl (trade name: Therm S-900) was used as heating medium, and the fresh heating medium (hydrogenated triphenyl) was supplied at 2.0 ml/min while the heating medium was removed via the outlet to keep the liquid level constant instead of introducing an inert gas. Intrinsic viscosity of the resulting polymer after the reaction for 8 hours was 1.05.

EXAMPLE 5

Polyester was produced in the same manner as described in Example 1, except that alkyl diphenyl (trade name: Therm S-800) was used as heating medium. After 10 hours of polycondensation, the resulting polyester was white and had intrinsic viscosity of 1.37.

EXAMPLE 6

Into a 500 ml reactor, equipped with a stirrer, an inert gas inlet, a gas outlet, and bottom discharge opening, were charged an oligomer directly obtained from esterification of terephthalic acid and ethylene glycol (containing 0.05 mol % of tungstic acid as a polymerization catalyst based on an acid component and having an intrinsic viscosity of 0.35) (5 g), and hydrogenated triphenyl (produced by Sin-Nihon Seitetsu Kagaku Kogyo KK, sold under the trade name of Therm S-900) (250 ml), and the mixture was heated with stirring at 250° C. under a nitrogen flow at 2.0 L/min. Waste gas, a part of heating medium and a by-product ethylene glycol were removed via discharge opening while a fresh heating medium was added to keep the constant liquid level. At 8 hours after beginning of the reaction, the obtained polyethylene terephthalate was removed, washed thoroughly with acetone and dried. The resulting polyester was white and had an intrinsic viscosity of 2.3.

Then the build-up polymer on the inside wall of the reactor was dissolved in 200 ml of m-cresol (the polymer was dissolved homogeneously without any residual insolubles, showing that there was no gelation occurred), which was reprecipitated with methanol, washed and dried to give polyester having the same intrinsic viscosity of 2.3.

EXAMPLE 7

Into a 300 ml separable reactor, equipped with a stirrer having a turbine impeller, a thermometer, an inert gas inlet and a gas outlet, were charged the same oligomer described in Example 6 containing tungsten (5 g), and Therm S-900 (200 ml), and the mixture was reacted with vigorous stirring at 240° C. During the reaction, heated nitrogen gas was supplied at 2.0 L/min and a fresh solvent was added to keep the constant liquid level. After 8 hours, the mixture was cooled and the polymer was removed, washed thoroughly with acetone and dried. The resulting polyester had an intrinsic viscosity of 3.03.

EXAMPLE 8

The procedure of Example 6 was repeated except that triethyl biphenyl (trade name: Therm S-800) was used as a heating medium. After 8 hours of the reaction, the intrinsic viscosity of the polymer was 2.0.

EXAMPLE 9

Into a 500 ml reactor, equipped with a stirrer, an inert gas inlet, a gas outlet and bottom discharge opening, were charged a polyester chip, which was directly obtained from esterification of terephthalic acid and ethylene glycol followed by the conventional melt polymerization (containing 0.05 mol % of antimony as a polymerization catalyst and having an intrinsic viscosity of 0.60) (50 g), and hydrogenated triphenyl (produced by Shin-Nihon Seitetsu Kagaku Kogyo KK, sold under trade name of Therm S-900) (250 ml) as a heating medium. The mixture was heated with stirring under a nitrogen flow at 2.0 L/min while the temperature was gradually raised up and kept at 230° C.

On raising temperature, polyester chip began to crystallize and was whitened at about 150° C. And a waste gas, a part of heating medium and a by-product glycol were removed via discharge opening, while a fresh heating medium was added to keep the constant liquid level.

After 8 hours, polyethylene terephthalate was removed, washed thoroughly with acetone and dried. The resulting polyester was white and had an intrinsic viscosity of 1.66.

REFERENCE EXAMPLE 1

There was carried out crystallization treatment at 150° C. using the same polyester chip in Example 9. The above polyester chip (50 g) was charged in a glass tube under dry nitrogen flow at 2.0 L/min at 230° C.

After 8 hours, the polyester was removed and the intrinsic viscosity thereof measured in the same manner as described in Example 1 was 0.90. The resulting polyester was pale yellow.

EXAMPLE 10

In the same manner as described in Example 9, except that polyester chip containing 0.05 mol % of tungsten was used instead of that containing antimony, a polyester having an intrinsic viscosity of 1.92 was obtained after 20 hours.

EXAMPLE 11

Into a polycondensation reactor shown in FIG. 1 were charged an oligomer obtained by the conventional melt polymerization (containing 0.10 mol % of antimony as a polymerization catalyst based on an acid component and having an intrinsic viscosity of 0.25) (50 g), and hydrogenated triphenyl (Therm S ® 900 (300 ml). The mixture was heated with stirring at 250° C. under a nitrogen flow at 3 L/min. Waste gas, a part of heating medium and by-product glycol were removed via discharge opening, while a fresh heating medium was added to keep the constant liquid level. After 14 hours, stirring was removed to precipitate the polymer at the bottom. The resulting polyester had an intrinsic viscosity of 1.2.

The polyester containing the heating medium was formed into a fiber under the spinning and stretching conditions indicated below, and washed with acetone to remove the heating medium, and the fiber having a tensile strength of 10 g/d was obtained.

Spinning Condition

Discharging Pressure: 1–2 kg/cm$^2$ G by nitrogen gas
Extruding Rate: 0.2 g/min
Temperature: 260°–270° C.

Take-up Rate: 20-50 m/min
Ambient Temperature: 30°-50° C.

Stretching Condition

Temperature: about 140° C.
Stretching ratio: 12-13 times
Stretching rate: 100 m/min Advantage of the Invention According to the process of the present invention, the polycondensation reaction in the specific heating medium provides various advantages, for example:

(1) it does not require any high power for stirring because the heating medium swells the polymer to reduce the viscosity of the said polymer;

(2) the polycondensation reaction can be carried out at a low temperature, which inhibits the thermal decomposition of the polymer and side reactions, therefore the resulting polymer is nearly free from coloring and has a high quality;

(3) it does not require high vacuum as well as a complex apparatus and enormous energy. Moreover, the resulting polyester can be formed into a fiber via spinning and stretching steps while swelled with the heating medium. Therefore, the process is remarkably simple and efficient with small energy loss compared with the conventional processes wherein the polyester is cooled, pelletized, and further heated and subjected to melt spinning. That is, the process of the present invention is industrially advantageous.

What is claimed is:

1. A process for production of polyester which comprises steps of:

subjecting aromatic dicarboxylic acid or alkyl ester thereof, and glycol to ester exchange reaction or esterification, and subjecting the resulting mixture to polycondensation in one or more of heating mediums selected from the group consisting of compounds having the following general formula (I) or (II) to give a polyester having an intrinsic viscosity of not less than 0.9:

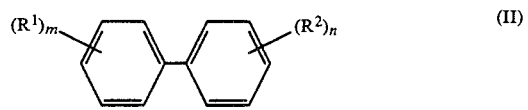

(wherein $A^1$ and $A^k$ are phenyl or $C_{5-20}$ cycloalkyl; $A^2$ to $A^{k-1}$ are, respectively, phenylene or $C_{5-20}$ cycloalkylene; $R^1$ and $R^2$ are $C_{1-20}$ alkyl; k is integer of 2-5; and m and n are integer of 0-5, provided that $n+m \geq 1$).

2. A process according to claim 1, wherein the polycondensation reaction is carried out with a blowing of an inert gas.

3. A process according to claim 1, wherein the polycondensation reaction is carried out with adding of a fresh heating medium while discharging of the medium and by-product.

4. A process according to claim 1, wherein the polycondensation reaction is carried out in the presence of tungsten compounds in the heating medium.

5. A process according to claim 1, wherein the polycodensation reaction is carried out in solid phase within the heating medium.

* * * * *

UNITED STATES PATENT AND TRADEMARK OFFICE
CERTIFICATE OF CORRECTION

PATENT NO. : 4,613,664

DATED : September 23, 1986

INVENTOR(S) : Susumu Tate et al

It is certified that error appears in the above-identified patent and that said Letters Patent is hereby corrected as shown below:

Claim 1, column 8, line 11, "$A^1-A^2\ A^k$" should be $--A^1-A^2-----A^k--$.

Claim 1, column 8, line 18, "$A_{k-1}^1$" should be $--A_{k-1}^1--$.

Claim 1, column 8, line 19, "$A^{k-1}$" should be $--A^{k-1}--$.

Signed and Sealed this

Twenty-seventh Day of January, 1987

*Attest:*

DONALD J. QUIGG

*Attesting Officer*  *Commissioner of Patents and Trademarks*